(12) United States Patent
Pengel et al.

(10) Patent No.: US 12,023,895 B2
(45) Date of Patent: Jul. 2, 2024

(54) COMPOSITE PANE HAVING SOLAR PROTECTION COATING AND THERMAL-RADIATION-REFLECTING COATING

(71) Applicant: SAINT-GOBAIN GLASS FRANCE, Courbevoie (FR)

(72) Inventors: Stefanie Pengel, Aachen (DE); Yael Bronstein, Paris (FR); Norbert Huhn, Herzogenrath (DE); Xavier Caillet, Fontenay-sous-Bois (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 72 days.

(21) Appl. No.: 17/908,780

(22) PCT Filed: Mar. 3, 2021

(86) PCT No.: PCT/EP2021/055332
§ 371 (c)(1),
(2) Date: Sep. 1, 2022

(87) PCT Pub. No.: WO2021/180544
PCT Pub. Date: Sep. 16, 2021

(65) Prior Publication Data
US 2023/0130714 A1  Apr. 27, 2023

(30) Foreign Application Priority Data
Mar. 10, 2020 (EP) ..................... 20161947

(51) Int. Cl.
*B32B 17/10* (2006.01)
*C03C 17/36* (2006.01)

(52) U.S. Cl.
CPC .. *B32B 17/10229* (2013.01); *B32B 17/10036* (2013.01); *B32B 17/10201* (2013.01);
(Continued)

(58) Field of Classification Search
CPC ...... C03C 17/3607–17/3697; B32B 17/10229; B32B 17/10761; G02B 5/282
See application file for complete search history.

(56) References Cited

U.S. PATENT DOCUMENTS 5,595,825 A * 1/1997 Guiselin ............. C03C 17/3681
428/428
6,924,037 B1  8/2005 Joret et al.
(Continued)

FOREIGN PATENT DOCUMENTS

CN       110121414 A       8/2019
DE    DE 199 27 683 C1    1/2001
(Continued)

OTHER PUBLICATIONS

International Search Report as issued in International Patent Application No. PCT/EP2021/055332, dated May 7, 2021.

*Primary Examiner* — Prashant J Khatri
(74) *Attorney, Agent, or Firm* — Pillsbury Winthrop Shaw Pittman LLP

(57) ABSTRACT

A composite pane includes an outer pane, an inner pane, and a thermoplastic intermediate layer. The composite pane has, between the outer and inner panes, a solar protection coating that substantially reflects or absorbs rays outside the visible spectrum of solar radiation. The solar protection coating includes starting from the outer pane, a layer sequence of first dielectric module (M1), first silver layer (Ag1), second dielectric module (M2), second silver layer (Ag2), third dielectric module (M3), third dielectric module (M3), third silver layer (Ag3), fourth dielectric module (M4), wherein the silver layers (Ag1, Ag2, Ag3) have a layer thickness relative to one another of Ag1/Ag2>1 and Ag1/Ag3>1, and the dielectric modules (M1, M2, M3, M4) have a relative layer thickness of M2/M1>1, M2/M3>1, and M2/M4>1.

20 Claims, 5 Drawing Sheets

Figure 1:
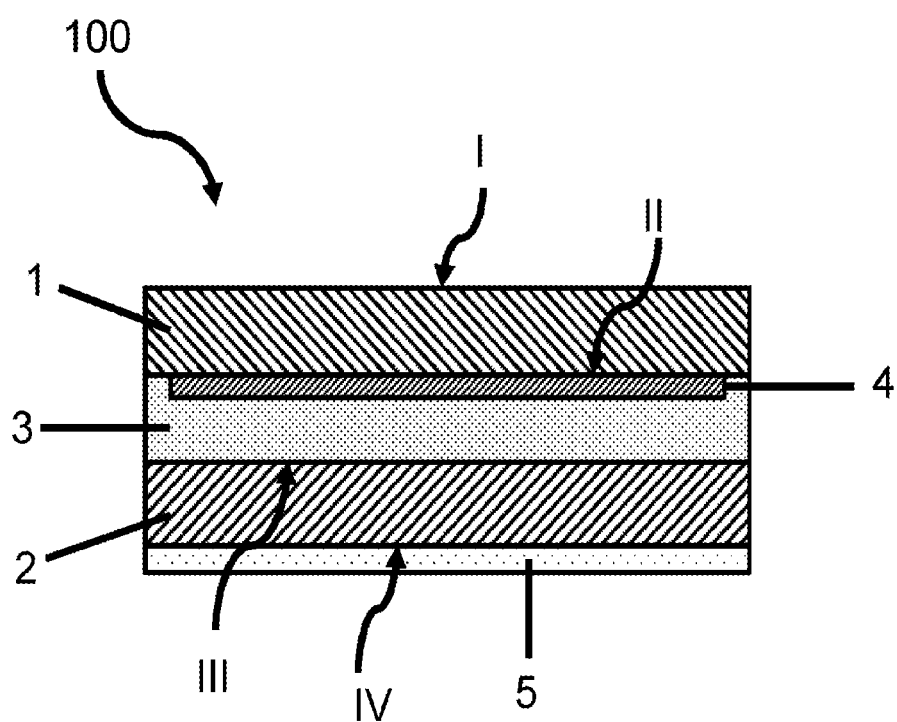

(52) U.S. Cl.
CPC .. *B32B 17/10651* (2013.01); *B32B 17/10761* (2013.01); *B32B 17/10807* (2013.01); *C03C 17/3613* (2013.01); *C03C 17/3626* (2013.01); *C03C 17/3639* (2013.01); *C03C 17/3644* (2013.01); *C03C 17/366* (2013.01); *B32B 2307/30* (2013.01); *B32B 2307/416* (2013.01); *B32B 2605/006* (2013.01); *C03C 2217/948* (2013.01); *Y10T 428/2495* (2015.01)

(56) References Cited

U.S. PATENT DOCUMENTS

| | | | | |
|---|---|---|---|---|
| 2004/0028953 | A1* | 2/2004 | Kraemling | B32B 17/10036 428/697 |
| 2016/0039713 | A1* | 2/2016 | Lemmer | E06B 3/66 428/34 |
| 2021/0107258 | A1* | 4/2021 | Horie | B32B 15/01 |

FOREIGN PATENT DOCUMENTS

| | | | | |
|---|---|---|---|---|
| WO | WO 2013/127563 A1 | 9/2013 | | |
| WO | WO 2013/131667 A1 | 9/2013 | | |
| WO | WO-2018207555 A1 * | 11/2018 | | B32B 15/01 |
| WO | WO 2019/110172 A1 | 6/2019 | | |
| WO | WO 2019/206493 A1 | 10/2019 | | |

* cited by examiner

COMPOSITE PANE HAVING SOLAR PROTECTION COATING AND THERMAL-RADIATION-REFLECTING COATING

CROSS-REFERENCE TO RELATED APPLICATIONS

This application is the U.S. National Stage of PCT/EP2021/055332, filed Mar. 3, 2021, which in turn claims priority to European patent application number 20161947.5 filed Mar. 10, 2020. The content of these applications are incorporated herein by reference in their entireties.

The invention relates to a composite pane having an improved solar protection coating and use thereof.

DE 19927683 C1 discloses a generic composite pane having at least two glass panes with a transparent intermediate layer joining them and is, furthermore, provided with a solar protection layer that substantially reflects solar radiation, in particular infrared rays outside the visible spectrum of solar radiation, in particular infrared radiation, wherein the composite glass pane is additionally provided, on its surface facing an interior space, with another transparent coating (low-E layer) substantially reflecting thermal radiation and spatially separated from the solar protection layer.

WO2013/127563 A1 discloses another generic composite pane having a solar protection layer between the glass panes and a low-E coating on the interior-side surface. The thermal-radiation-reflecting coating (low-E coating) is based on niobium, tantalum, molybdenum, or zirconium.

WO2019/110172 A1 discloses a composite glass pane with an outer pane having an exterior-side surface and an interior-side surface, an inner pane having an exterior-side surface and an interior-side surface and a thermoplastic intermediate layer that joins the interior-side surface of the outer pane to the exterior-side surface of the inner pane, wherein the composite pane has, between the outer pane and the inner pane, at least one solar protection coating, which substantially reflects or absorbs rays outside the visible spectrum of solar radiation, in particular infrared radiation, and wherein the composite glass pane has, on the interior-side surface of the inner pane, a thermal-radiation-reflecting coating, wherein the composite pane has a transmittance index A of 0.02 to 0.08, with the transmittance index A (A value) determined according to the following formula (I)

$$A = TL_{Composite\ glass\ pane}/(TL_{Low-E\ coated\ pane} * TE) \quad (I),$$

where TL is the light transmittance level, and TE is the energy transmittance, each measured according to ISO 9050. With such a composite pane, it was possible to achieve low TTS values of less than 50%, in combination with low light transmittance of 1-12%, with the light reflection of the composite pane additionally being less than 6%.

The object of the present invention consists in providing a further improved composite pane having a solar protection function and an optional thermal protection function. In particular, the object of the invention is to further improve the energy, thermal, and optical properties of the composite pane. A further object is to achieve, at the same time, improved aesthetic appearance, in particular, as free as possible of undesirable color tones in the reflection of the composite pane.

These and other objects are accomplished according to the invention by a composite pane according to the independent claim 1. Advantageous embodiments of the invention are apparent from the subclaims.

The composite pane according to the invention comprises an outer pane having an exterior-side surface (side I) and an interior-side surface (side II), an inner pane having an outer surface (side III) and an interior-side surface (side IV) and a thermoplastic intermediate layer that joins the interior-side surface of the outer pane to the exterior-side surface of the inner pane, wherein the composite pane has, between the outer pane and the inner pane, at least one solar protection coating that substantially reflects or absorbs rays outside the visible spectrum of solar radiation, in particular infrared radiation, wherein the solar protection coating viewed from the direction of the outer pane includes a layer sequence first dielectric module (M1),
first silver layer (Ag1),
second dielectric module (M2),
second silver layer (Ag2),
third dielectric module (M3),
third silver layer (Ag3),
fourth dielectric module (M4).

The silver layers (Ag1, Ag2, Ag3) of the solar protection coating according to the invention have a layer thickness relative to one another of Ag1/Ag2>1 and Ag1/Ag3>1, and the dielectric modules (M1, M2, M3, M4) have a layer thickness relative to one another of M2/M1>1, M2/M3>1, and M2/M4>1.

In other words, provision is made according to the invention for the layer thickness of the first silver layer (Ag1) of the solar protection coating to be thicker than the next two other silver layers Ag2 and Ag3 that are arranged in the layer sequence of the solar protection coating below the first silver layer and thus farther away from the outer pane. In addition, provision is made for the layer thickness of the second dielectric module M2 to be larger than each of the other dielectric modules M1, M3, and M4.

Surprisingly, it has been shown that such a composite glass pane according to the invention has, compared to the previously known composite glass panes with solar protection coating, significantly improved energy properties and, at the same time, good optical and aesthetic properties; in particular, undesirable color tones in the reflection of the composite pane can be minimized or even avoided.

The central element of the composite pane according to the invention is the solar protection coating and its specific layer structure. Solar protection coatings with multiple functional layers enable high reflectivity for infrared radiation with, at the same time, high transmittance in the visible spectral range. The solar protection coating has, according to the invention, a layer sequence of at least three functional transparent silver layers that have, relative to one another, a specific layer thickness. Provision is made for the layer thickness of the first silver layer (Ag1) of the solar protection coating, which is arranged closest to the outer pane, to be thicker than the next two silver layers Ag2 and Ag3 in the layer sequence, which follow below the first silver layer Ag1 in the layer sequence of the solar protection coating. In each case, the silver layers are arranged between dielectric modules, i.e., dielectric layers.

The thickness of each functional silver layer of the solar protection coating is preferably from 5 nm to 25 nm, particularly preferably from 8 nm to 20 nm. The total layer thickness of all functional silver layers of the solar protection coating is preferably from 20 nm to 80 nm, particularly preferably from 30 nm to 60 nm. In these ranges for the thicknesses of the functional layer and the total thickness of all functional silver layers, particularly good results are achieved in terms of the solar protection function and transparency.

According to the invention, the term "a dielectric module Mi" (M1, M2, M3, M4) means a dielectric layer which can be formed from a single ply, i.e., a single dielectric layer, or from multiple plies of dielectric layers.

The solar protection coating preferably comprises at least four dielectric modules (M1, M2, M3 and M4), i.e., at least four dielectric layers. Each functional silver layer is arranged between two dielectric layers. The functional layers and the dielectric layers are arranged such that at least one dielectric layer is arranged in each case between two adjacent functional silver layers, between which no other functional silver layer is arranged, and that at least one other dielectric layer is arranged above the uppermost functional layer; and that at least one other dielectric layer is arranged below the lowest functional layer. According to the invention, the dielectric modules preferably have a thickness from 10 nm to 100 nm, particularly preferably from 20 nm to 90 nm, for example, between 70 nm and 85 nm.

The dielectric layers of the solar protection coating can contain suitable materials, for example, at least one metal oxide, such as $ZnO$, $SnO_2$, $BiO_3$, $TiO_2$, and/or at least one metal nitride, such as AlN. In a preferred embodiment of the composite pane according to the invention, provision is made for the dielectric modules (M1, M2, M3, M4) to have at least one metal nitride, in particular at least one silicon nitride layer ($Si_3N_4$). The dielectric modules contain at least one ply (layer) of one of the dielectric modules of the solar protection coating; in other words, preferably contain silicon nitride, or consist thereof. The silicon nitride can also have dopants, for example, aluminum.

If a first layer of a coating is arranged above a second layer of a coating of the composite pane, this means, in the context of the invention, that the first layer is arranged closer to the surface of the outer pane than the second layer. If a first layer of a coating is arranged below a second layer of the coating, this means, in the context of the invention, that the second layer is arranged farther away from the surface of the outer pane than the first layer. If a first layer of a coating is arranged above or below a second layer of the coating, this does not necessarily mean, in the context of the invention, that the first and the second layer are in direct contact with one another, unless this is explicitly stated. In other words, one or more additional layers can be arranged between the first and the second layer, provided this is not explicitly ruled out. If a first layer is arranged between two other layers, this means, in the context of the invention, that the one additional layer is arranged above the first layer and the other additional layer is arranged below the first layer.

The solar protection coating can include further layers known per se to the person skilled in the art, for example, smoothing layers, sacrificial layers, barrier layers, and/or blocking layers.

In a preferred embodiment, the solar coating includes at least one blocking layer. According to the invention, the blocking layer preferably contains or is made of at least nickel chromium (NiCr) and/or titanium chromium. The blocking layer is preferably arranged between at least one functional silver layer and at least one dielectric layer. The blocking layer is preferably situated in direct contact with the functional silver layer. Particularly preferably, each functional silver layer is situated in direct contact with at least one blocking layer. It is particularly advantageous for each functional silver layer to be arranged between two blocking layers, with the functional layer preferably in direct contact with the two blocking layers surrounding it, arranged above and below it. Protection of the functional layer during heating, in particular during production of the composite pane according to the invention is achieved by means of the blocking layer. The thickness of the blocking layers is preferably on the order of a few nanometers, and is, for example, from 0.1 nm to 3 nm. The blocking layer can preferably have a thickness of less than 1 nm, for example, of 0.1 nm, 0.2 nm, 0.3 nm, 0.4 nm, 0.5 nm, 0.6 nm, 0.7 nm, or 0.8 nm.

The composite pane is intended, in a window opening, to separate an interior space, in particular the interior of a vehicle from the external environment. The composite pane is a laminate and comprises a first and a second glass that are referred to in the context of the invention as "outer pane" and "inner pane" and are joined to one another via a thermoplastic intermediate layer. In the context of the invention, "inner pane" is the pane that faces the interior in the installed position. "Outer pane" refers to the pane facing the external environment in the installed position. "Interior-side surface" (or "inner side" or "inner surface") means, in the context of the invention, that surface of the panes that faces the interior in the installed position. "Exterior-side surface" (or "outer side" or "outer surface") means, in the context of the invention, that surface of the panes that faces the external environment in the installed position.

The surfaces of the panes are typically referenced as follows: The outer side of the outer pane is referred to as side I. The inner side of the outer pane is referred to as side II. The outer side of the inner pane is referred to as side III. The inner side of the inner pane is referred to as side IV.

Independently of one another, the outer pane and the inner pane are preferably made of glass or plastic, preferably soda lime glass, alkali aluminosilicate glass, polycarbonate, or polymethacrylate. In a particularly preferred embodiment, the outer pane and the inner pane are made of glass.

Suitable glass panes include glass panes that are known under the tradenames Planiclear® and Planilux® (clear glass, in each case), VG 10, VG20, VG40 or TSANx, TSA3+, TSA4+ from Saint-Gobain, with the glasses from the VG series gray-colored glasses and those of the TSA series green-colored glasses.

Independently of one another, the outer and/or the inner pane preferably has a thickness from 0.1 to 4 mm, preferably from 1 to 4 mm, particularly preferably from 1.6 mm to about 2.1 mm.

The interior-side surface of the outer pane and the exterior-side surface of the inner pane face one another and are bonded to one another by means of the thermoplastic intermediate layer.

The thermoplastic intermediate layer is formed by one or more thermoplastic films, wherein in the resulting composite pane, it is possible that the individual films in the resulting intermediate layer can no longer be distinguished from one another. The thermoplastic films preferably contain polyvinyl butyral (PVB), ethylene vinyl acetate (EVA), polyurethane (PU), and/or mixtures thereof and/or copolymers thereof, particularly preferably polyvinyl butyral. The films are preferably based on the materials mentioned but can, however, contain other components, for example, plasticizers, colorants, IR or UV absorbers.

The individual polymer films of the intermediate layer, in particular the PVB films, preferably have a thickness of about 0.2 mm to 1 mm, for example, 0.38 mm, 0.76 mm, or 0.81 mm. Other properties of the composite glass pane can be influenced by the thickness of the films. For example, thicker PVB films provide improved sound damping, in particular when they contain an acoustically active core, increased break-in resistance of the composite glass pane, and also increased protection against ultraviolet radiation (UV protection).

In another preferred embodiment of the composite pane according to the invention, provision is made for the silver layers of the solar protection coating (Ag1, Ag2, Ag3) to have a relative layer thickness of Ag1/Ag2>1 and 1<Ag1/Ag3<3, preferably a relative layer thickness of 1<Ag1/Ag3<2.6. In other words, the thickness of the first silver layer is greater than that of the second silver layer; and the layer thickness of the first silver layer relative to the third silver layer is between 1 and 3, preferably between 1 and 2.6. By setting these relative layer thicknesses of the functional silver layers, it was possible to further improve and optimize the energy and optical properties, while, at the same time, optimum aesthetic appearance can be achieved without undesirable color tones in the reflection of the composite pane. In particular, undesirable red and yellow reflections or haze of the composite pane can be avoided.

In addition, the visual comfort of the resulting composite glass pane can be improved or can be maintained at a good value compared to the previously known composite panes, with improved thermal comfort.

In another embodiment of the composite pane according to the invention, provision is made for the second and the third silver layer (Ag2, Ag3) of the solar protection coating to have a layer thickness of 0.5<Ag2/Ag3<2.0 relative to one another.

In another preferred embodiment, provision is made for the dielectric modules (M1, M2, M3, M4) to have a relative layer thickness of M2/M1>1, M2/M3>1.1, and M2/M4>1.5.

According to the invention, the solar protection coating is arranged between the outer pane and the inner pane. In a preferred embodiment, the solar protection coating is applied on the interior-side surface of the outer pane (side II).

In another preferred embodiment, the solar protection coating is embedded in the thermoplastic intermediate layer. The solar protection coating can be applied on a thermoplastic film. In a preferred embodiment, the solar protection coating is applied on a carrier film that is arranged, in the production of the composite pane, for example, between two thermoplastic films that serve to form the intermediate layer. The thermoplastic intermediate layer of the composite pane contains a carrier film, which has the solar protection coating above it, i.e., on the surface facing the outer pane. The carrier film preferably contains or is made of polyethylene terephthalate (PET) and has a thickness from 20 μm to 100 μm, preferably 38 μm to 86 μm, for example, roughly 50 μm. However, the carrier film can also be made of other suitable plastics.

In another preferred embodiment, the solar protection coating is applied on the exterior-side surface III of the inner pane.

In a preferred embodiment, the composite pane can have a thermal-radiation-reflecting coating (low-E coating) on the interior-side surface (side IV) of the inner pane. According to the invention, the composite panes can then have particularly low total transmitted thermal radiation (TTS) of less than 14%, in particular less than 13% (measured in accordance with ISO13837), while, at the same time, optimum aesthetic appearance can be achieved without undesirable color tones in the reflection of the composite pane. In particular, undesirable red and yellow reflections or haze of the composite pane can be avoided.

According to the invention, a coating reflecting the thermal radiation can be applied, i.e., optionally, to the inner side of the inner pane (side IV), which coating improves the performance of the composite pane with the solar protection coating in terms of the possible TTS values compared to the previously known composite panes.

Such coatings are known, for example, from WO2013/131667A1. The thermal-radiation-reflecting coating can also be referred to as a thermal protection coating, coating with low emissivity, emissivity-reducing coating, low-E coating, or low-E layer. It has the function of reflecting thermal radiation, i.e., in particular IR radiation, which has longer wavelengths than the IR component of solar radiation. At low outside temperatures, the low-E coating reflects heat back into the interior and reduces the cooling of the interior. At high outside temperatures, the low-E coating, in addition to the solar protection coating, reflects the thermal radiation of the heated composite pane outward and reduces the heating of the interior. Together with the solar protection coating according to the invention, the low-E coating reduces the emission of thermal radiation from the pane particularly effectively in the summer and reduces the emission of heat into the external environment in the winter.

According to the invention, thermal-radiation-reflecting coatings with low emissivity known to date, for example, from WO2013/127563 A1 or WO2019/110172 A1, are suitable to be used in the composite pane according to the invention. It is possible, with a combination of the solar protection coating according to the invention and a low-E coating for the composite pane, to achieve light transmittance (TL) of visible light with improved energy values (TTS<14%) of 1-12%, preferably between 5% and 10%.

The thermal-radiation-reflecting coating of the composite pane preferably includes a functional layer that contains a transparent conductive oxide (TCO), preferably indium tin oxide (ITO), or tin oxide ($SnO_2$), which are [sic] arranged between dielectric layers. The dielectric layers, can be formed in particular from dielectric oxides or nitrides, such as ZnO, SnZnO, AlN, $TiO_2$, $SiO_2$, or $Si_3N_4$.

However, the functional layer of the low-E coating can also contain other electrically conductive oxides, for example, fluorine-doped tin oxide ($SnO_2$:F), antimony-doped tin oxide ($SnO_2$:Sb), mixed indium zinc oxide (IZO), gallium-doped or aluminum-doped zinc oxide, niobium-doped titanium oxide, cadmium stannate, and/or zinc stannate. Particularly good results in terms of emissivity and bendability of this coating are thus achieved.

In one embodiment of the invention, the low-E coating has emissivity of at most 50%, preferably at most 30% auf. In other words, it is also preferred for the interior-side emissivity of the composite pane according to the invention to preferably be less than or equal to 50%, particularly preferably from 10% to 50%, most particularly preferably from 20% to 35%, for example, less than or equal to 30%. "Interior-side emissivity" refers to the measure indicating how much thermal radiation the pane with the low-E coating emits in the installed position compared to an ideal heat radiator (a black body) into an interior, for example, of a building or of a vehicle. In the context of the invention, "emissivity" means the normal emissivity at 283 K according to the standard EN 12898.

According to the invention, the composite glass pane has external energy reflection RE>36%, preferably RE>39%. A calculation of the energy value RE is carried out in accordance with the standard ISO 9050.

In one embodiment of the composite glass pane according to the invention, it has exterior-side reflectance (visible external reflection RLext) of RLext>8%, preferably between 10% and 22%, when using a standardized A emitter at an angle of incidence of 2°. A calculation of the optical value RLext is carried out in accordance with the EN 410 standard with light type A.

Here, exterior-side reflectance describes the reflected portion of the incident visible radiation from the external environment.

The invention further includes a method for producing a composite pane according to the invention having a solar protection coating, comprising the following steps.

Applying a solar protection coating on the inner surface (II) of the outer pane, or on the outer surface (III) of the inner pane, or introducing the solar protection coating into the thermoplastic intermediate layer; and Joining the outer pane and the inner pane via the thermoplastic intermediate layer.

In another embodiment of the method, applying a thermal protection coating on the inner surface (IV) of the inner pane is provided as a further step.

The solar protection coating can be applied before, after, or simultaneously with the application of the thermal-radiation-reflecting coating. The outer pane and the inner pane are joined to form the composite glass after both the solar protection coating and the thermal protection coating have been applied.

Both the solar protection coating 4 and the thermal protection coating 5 can withstand high thermal loads such that they can also withstand temperature treatment or bending of the panes 1, 2 at temperatures typically exceeding 600° C. without damage.

The individual layers of the solar protection coating as well as the thermal-radiation-reflecting coating can be deposited by methods known per se, preferably by magnetron-enhanced cathodic sputtering and built up in the suitable layer thicknesses and layer sequences. The cathodic sputtering can be carried out in a protective gas atmosphere, for example, of argon, or in a reactive gas atmosphere, for example, by addition of oxygen or nitrogen. However, the individual layers can also be applied by other suitable methods known to the person skilled in the art, for example, vapor deposition or chemical vapor deposition.

The thermoplastic intermediate layer can be provided in the form of a thermoplastic film. However, the thermoplastic intermediate layer can also [sic: be provided] in the form of multiple films, for example, two or more thermoplastic films, optionally, an additional carrier film. The application of the solar protection coating on the thermoplastic intermediate layer includes only the application of the solar protection coating on one of the films, for example, on the carrier film. During the joining of the pane to form the composite glass, the carrier film with a solar protection coating arranged thereon is preferably arranged between two thermoplastic films, with the surface of the solar protection coating facing the outer pane.

The joining of the outer pane and the inner pane via the thermoplastic intermediate layer to form the composite pane is preferably done by lamination under the action of heat, vacuum, and/or pressure. Methods known per se for producing a composite pane can be used. During lamination, the heated, flowable thermoplastic material flows around the solar protection coating such that a stable bond is established and the solar protection coating is encapsulated in the intermediate layer and protected against damage and environmental influences.

For example, so-called autoclave methods can be carried out at an elevated pressure of approx. 10 bar to 15 bar and temperatures of 130° C. to 145° C. for about 2 hours. Vacuum bag or vacuum ring methods known per se operate, for example, at about 200 mbar and 80° C. to 110° C. The outer pane, the thermoplastic intermediate layer, and the inner pane can also be pressed in a calender between at least one roller pair to form a pane. Systems of this type are known for producing panes and usually have at least one heating tunnel upstream from a pressing unit. The temperature during the pressing operation ranges, for example, from 40° C. to 150° C. Combinations of calendering and autoclaving methods have proved particularly effective in practice. Alternatively, vacuum laminators can be used. These consist of one or more heatable and evacuable chambers in which the panes are laminated within, for example, about 60 minutes at reduced pressures of 0.01 mbar to 800 mbar and temperatures from 80° C. to 170° C.

The invention further includes the use of the composite pane according to the invention having a solar protection coating and a low-E coating in means of locomotion for travel on land, in the air, or on water, in particular in motor vehicles, for example, as a windshield, rear window, side window, and/or roof panel, and as a functional individual piece, and in buildings.

All standards mentioned refer to the version valid on the filing date.

The various embodiments of the invention can be implemented individually or in any combinations. In particular, the features mentioned above and to be explained in the following can be used not only in the combinations indicated, but also in other combinations or in isolation, without departing from the scope of the invention, unless exemplary embodiments and/or their features are explicitly mentioned only as alternatives or are mutually exclusive.

In the following, the invention is presented in more detail with reference to the figures. It should be noted that different aspects are described, each of which can be used individually or in combination. In other words, any aspects can be used with different embodiments of the invention unless explicitly presented as a pure alternative.

The drawings are simplified schematic representations and are not to scale. The drawings in no way restrict the invention.

Figure 2:
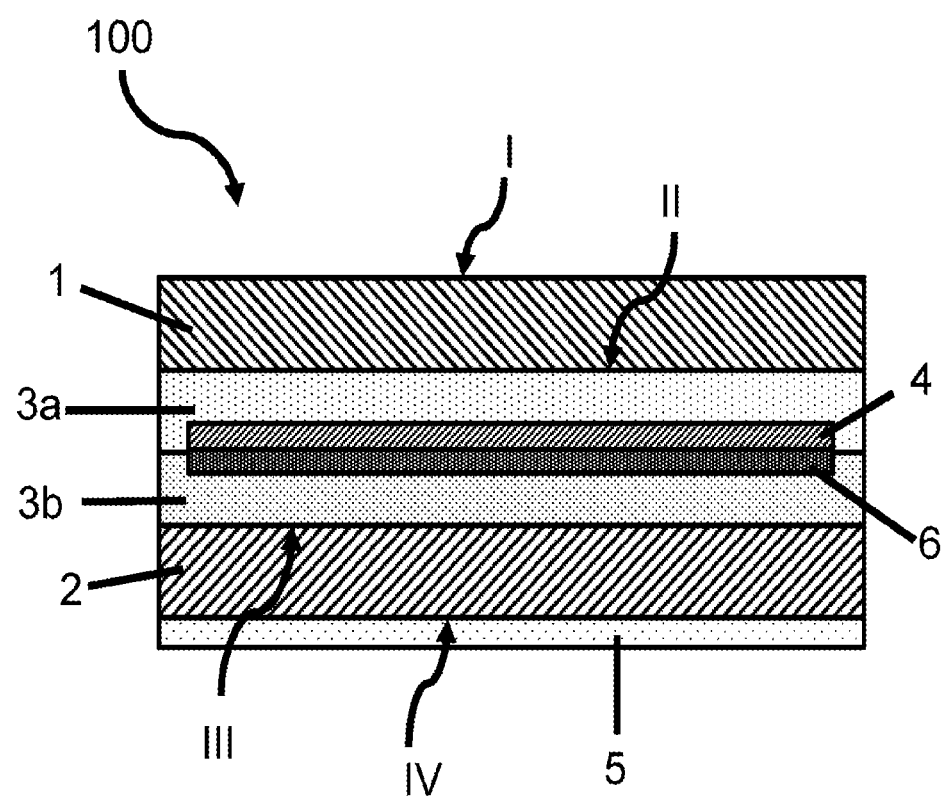
Figure 3:
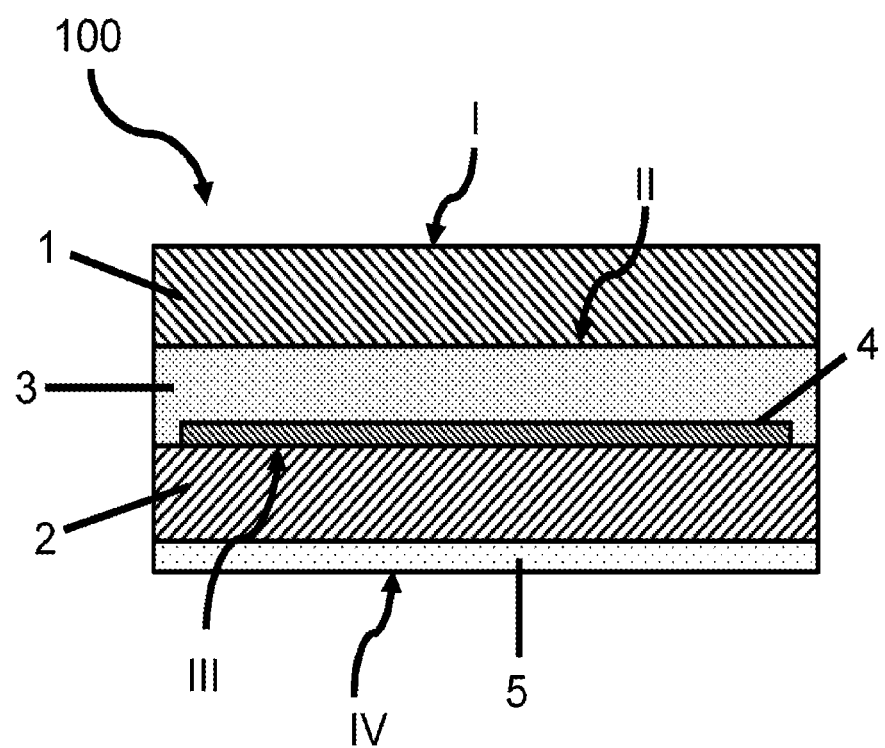

They depict:

FIG. 1 a cross-section through a first embodiment of the composite pane according to the invention having a solar protection layer and a thermal-radiation-reflecting layer, FIG. 2 a cross-section through another embodiment of the composite pane according to the invention having a solar protection layer and a thermal-radiation-reflecting layer, FIG. 3 a cross-section through another embodiment of the composite pane according to the invention having a solar protection function and a heat protection function.

Figure 4:
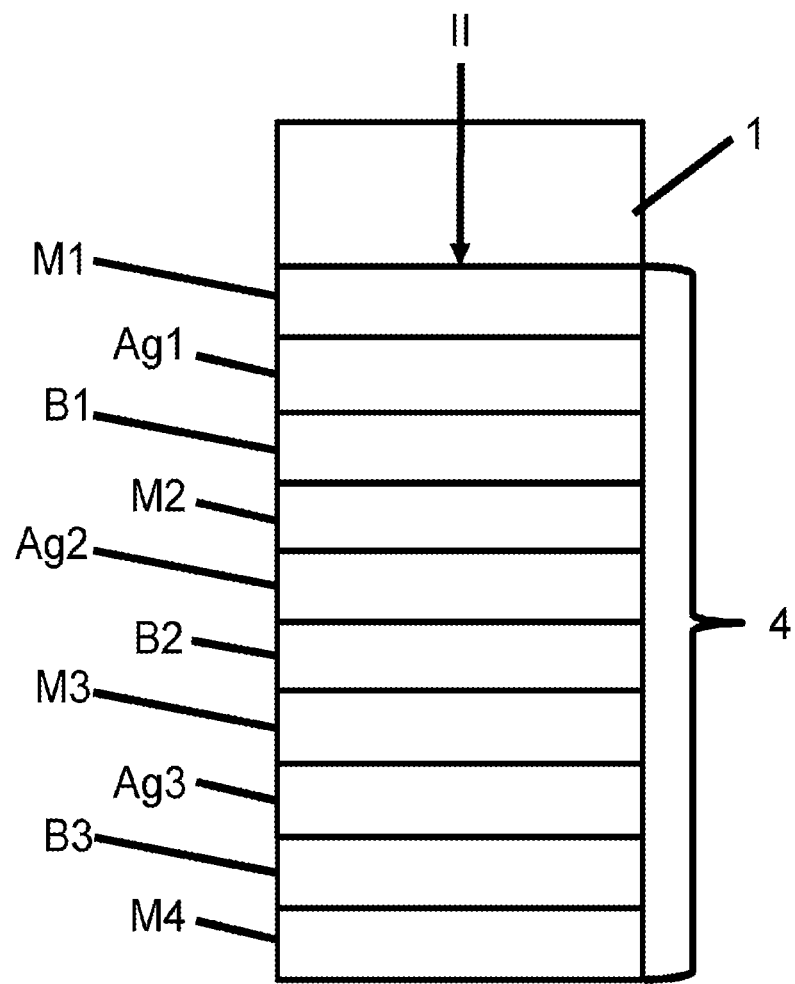
Figure 5:
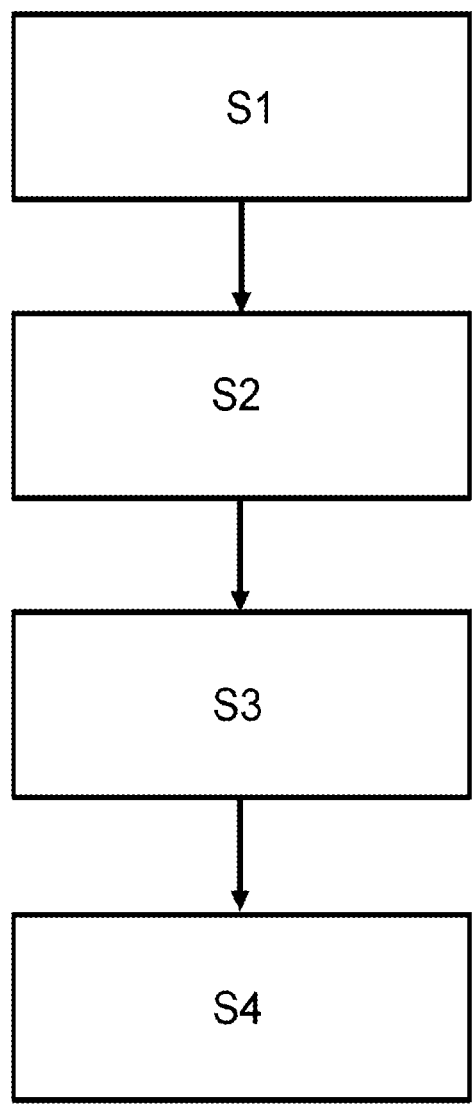

FIG. 4 a schematic representation of the structure of a solar protection layer according to the invention applied on the outer pane of the composite pane;

FIG. 5 an exemplary embodiment of the method according to the invention referencing a flow chart.

FIG. 1 depicts a cross-section through an embodiment of the composite pane 100 according to the invention having a solar protection coating 4 and a low-E coating 5. The composite pane 100 comprises an outer pane 1 and an inner pane 2 joined to one another via a thermoplastic intermediate layer 3. The composite pane 100 can, for example, have a size of about 1 m$^2$ and be provided as a roof panel of a passenger car, with the outer pane 1 facing the external environment and the inner pane 2 facing the vehicle interior. The outer pane 1 has an outer surface (I) and an inner surface (II). The inner pane 2 has an outer surface (III) and an inner surface (IV). The outer surfaces (I) and (III) face the external environment; the inner surfaces (II) and (IV) face the vehicle interior. The inner surface (II) of the outer pane 1 and the outer surface (III) of the inner pane 2 face one another.

In this embodiment, a solar protection coating 4 according to the invention is arranged on the inner surface (II) of the outer pane 1. The solar protection coating 4 extends over the entire inner surface (II), preferably minus a circumferential frame-shaped coating-free region, for example, with a width of 8 mm. The coating-free region can then be hermetically sealed by bonding to the thermoplastic intermediate layer 3. The solar protection coating 4 is thus advantageously protected against damage and corrosion.

According to the invention, the solar protection coating 4 comprises at least three functional silver layers, each of which has a layer thickness between 5 nm and 20 nm, with each functional silver layer being arranged between dielectric modules, for example, layers of silicon nitride. The silver layers (Ag1, Ag2, Ag3) of the solar protection coating according to the invention have a layer thickness relative to one another of Ag1/Ag2>1 and Ag1/Ag3>1; and the dielectric modules (M1, M2, M3, M4) have a layer thickness relative to one another of M2/M1>1, M2/M3>1, and M2/M4>1.

The solar protection coating 4 can additionally have further layers, such as sacrificial layers, barrier layers, smoothing layers, or blocking layers. Such layers can, for example, protect the solar protection coating 4 against environmental influences, for example, against oxidation, and improve its durability and environmental resistance. The structure according to the invention of the solar protection coating 4 is explained in greater detail below with respect to FIG. 4. The solar protection coating 4 results in reduced heating of the vehicle interior and of the inner pane 2 due to the reflection of infrared radiation. According to the invention, energy reflection RE>36%, preferably >39% can be achieved. Also, in addition to good improved thermal comfort compared to previously known systems, with the solar protection coating 4 according to the invention, good optical and aesthetic properties of the composite pane 100 are achieved at the same time.

A thermal protection coating 5 is optionally arranged on the inner surface (IV) of the inner pane 2. In this preferred embodiment, it is possible for the composite pane to have not only good energy reflection RE>39%, but also particularly low total transmitted thermal radiation of TTS<14%, preferably <13%. On the one hand, the thermal protection coating 5 reduces the emission of thermal radiation through the composite pane 100 into the vehicle interior, in particular at high outside temperatures. On the other hand, the thermal protection coating 5 can reduce the emission of thermal radiation out of the vehicle interior at low outside temperatures. in addition, the thermal protection coating 5 can reduce the transmittance of visible light into the vehicle interior such that no tinted pane or a less tinted pane has to be used if such reduced transmittance is desirable, for example, in the case of roof panels. These are major advantages of the composite pane according to the invention, since the interior climate of the vehicle is significantly improved and the need for the use of air conditioning systems is reduced. In terms of energy performance, in particular to achieve energy reflection RE>36 and the lowest possible TTS value of the resulting composite pane 100, it is preferred according to the invention to apply the solar protection coating 4 on a clear, non-tinted glass pane (inner side II of the outer pane 1). On the other hand, optionally, in order to neutralize, or improve, the external appearance of the composite pane 100, it can be useful for the solar protection coating 4 to be applied on a tinted glass pane (outer pane 1).

FIG. 2 depicts a cross-section through another embodiment of the composite pane 100 according to the invention having a solar protection coating and a thermal protection coating 4, 5. In contrast to FIG. 1, the solar protection coating 4 is arranged not on the inner surface (II) of the outer pane 1, but on a carrier film 6 in the intermediate layer 3. The carrier film 6 preferably contains or is made of polyethylene terephthalate (PET) and has, for example, a thickness of 50 μm. The solar protection layer 4 according to the invention comprises a layer structure, which is explained in greater detail with regard to FIG. 4. The carrier film 6 with the solar protection coating 4 is arranged between a first thermoplastic film 3a and a second thermoplastic film 3b. In the resulting composite pane, the thermoplastic films 3a and 3b and the carrier film 6 form the thermoplastic intermediate layer 3. The thermoplastic films 3a and 3b preferably contain or are made of PVB and have, for example, a layer thickness of 0.38 mm. The carrier film 6 is somewhat smaller than the outer pane 1, the inner pane 2, and the thermoplastic films 3a and 3b. The carrier film 6 is arranged in the composite such that the carrier film 6 does not extend all the way to the lateral edges of the composite glass. As a result, the carrier film 6 is surrounded in the edge region of the composite pane for example, circumferentially by the thermoplastic films 3a and 3b, with a width of approx. 8 mm. The solar protection coating 4 on the carrier film 6 is thus advantageously protected against damage and, in particular, corrosion. The thermal protection coating 5 on the inner surface (IV) of the inner pane 2 is designed as in FIG. 1.

FIG. 3 depicts a cross-section through another embodiment of the composite pane 100 according to the invention having a solar protection coating and a thermal protection coating 5, 4. In contrast to FIG. 1, the solar protection coating 4 is arranged not on the inner surface (II) of the outer pane 1, but on the outer surface (III) of the inner pane 2, with a circumferential edge region of the outer surface (III) not provided with the solar protection coating 4. In this embodiment as well, the solar protection coating 4 is advantageously protected against damage and corrosion. For the rest, this embodiment corresponds to the design depicted in FIG. 1.

FIG. 4 depicts a schematic structure of a solar protection layer 4 according to the invention. In the embodiment depicted, the solar protection coating 4 is applied on the inner side II of the outer pane 1 as a substrate. The solar protection coating 4 depicted contains three transparent functional silver layers Ag1, Ag2, and Ag3, which are, in particular, the infrared radiation-reflecting layers. According to the invention, these functional silver layers have a certain thickness relative to one another; specifically, provision is made according to the invention for the relative layer thicknesses to be Ag1/Ag2>1 and Ag1/Ag3>1. In other words, the layer thickness of the first silver layer Ag1, which is arranged closest to the outer pane 1, is thicker than the second silver layer Ag2 and the third silver layer Ag3 following below in the layer sequence. The silver layers can be deposited, for example, by cathodic sputtering in an argon atmosphere.

Dielectric layers, or dielectric modules M1, M2, M3, and M4 are in each case arranged above and below the silver layers Ag1, Ag2, and Ag3. According to the invention, these dielectric modules (M1, M2, M3, M4) have, relative to one another, a layer thickness M2/M1>1, M2/M3>1, and M2/M4>1. The dielectric module M1 is thus arranged above the first silver layer Ag1 directly on the inner side II of the outer pane 1; the second dielectric module M2 is arranged below the first silver layer Ag1. The first dielectric module M1 can, for example, be structured, starting from the outer pane 1, as a layer sequence of silicon nitride, ZnSnOx, and ZnO layers. The silicon nitride layer can be deposited from silicon nitride in a nitrogen-containing atmosphere; the zinc oxide layer, from zinc oxide in an oxygen-containing atmosphere.

The solar coating 4 contains at least one blocking layer; particularly preferably each functional silver layer Ag1, Ag2, Ag3 is situated, as depicted, in direct contact with at least one blocking layer B1, B2, and B3. According to the invention, the blocking layers preferably contain or are made of at least nickel, chromium, or alloys thereof and/or titanium chromium. The blocking layers B (B1, B2, B3) are preferably arranged between at least one functional silver layer and at least one dielectric layer. The blocking layers B protect the functional layer during heating, in particular during production of the composite pane according to the invention.

FIG. 5 depicts an exemplary embodiment of the method according to the invention referencing a flow chart comprising the following steps.

S1: Providing an outer pane 1, an inner pane 2, and at least one thermoplastic film for forming the thermoplastic intermediate layer 3;

S2: Applying a solar protection coating according to the invention on the inner surface II of the outer pane 1 or on the outer surface of the inner pane 2, for example, by means of cathodic sputtering;

S3: Optionally applying a thermal protection coating 5 on the inner side IV of the inner pane 2;

S4: Joining the outer pane 1 and the inner pane 2 via the thermoplastic intermediate layer 3 to form the composite pane 100.

In one embodiment, glass panes are used as the outer pane 1 and as the inner pane 2. In a preferred embodiment of the method, the solar protection coating 4 having the at least three functional silver layers Ag1, Ag2, and Ag3 and the at least four dielectric modules M1, M2, M3, and M4 is applied on the inner side II of the outer pane 1, preferably by means of magnetron-enhanced cathodic sputtering. Temporally, the solar protection coating 4 can be applied before, after, or simultaneously with the optional application of the thermal-radiation-reflecting coating 5 on the inner side IV of the inner pane 2. The joining of the outer pane 1 and the inner pane 2 via the intermediate layer to form the composite glass is preferably done after both the solar protection coating 4 and the optional thermal protection coating 5 have been applied.

EXAMPLES

All optical, aesthetic, and energy properties of the composite panes were measured in the laminated state or calculated for a laminated composite pane. In the Examples, the solar protection coating 4 was applied on the inner side II of a clear outer pane 1 (Example Planiclear). A tinted PVB film was used in the intermediate layer. The low-E coating was applied on the inner side IV of a dark-tinted inner pane 2 (Example VG10). The low-E coating had emissivity of 30%. The low-E coating is based on an ITO (indium tin oxide) layer encapsulated between dielectric layers ($Si_3N_4$, SiO).

Example 1 and the Comparative Example 1 were obtained by computer simulation. Examples A through E according to the invention were produced as a composite pane (roof panel for a vehicle) with the solar protection coatings indicated.

For each Example, the stack structure of the solar coating (layers and layer thicknesses) and the optical properties of the coating in the finished composite pane are indicated.

Example 1 and Comparative Example 1 (Computer Simulated in Each Case)

The layer sequences of the solar protection coatings and the layer thicknesses are presented in Table 1. The relative layer thicknesses of the silver layers and the dielectric modules, as well as the values for the optical and energy properties are reported in Table 2 and Table 3.

Abbreviations:

RE energy reflection [%]

RLext visible external reflection [%]

TL visible light transmittance [%]

TTS total transmitted thermal radiation [%]

RL at 60° visible reflection at a viewing angle of 60° [%]

RLint visible internal reflection [%]

L*, a*, b* color coordinates (CIE color space, International Commission on Illumination)

The values for light transmittance (TL) and reflection (RL) refer to the light type A, i.e., the visible portion of sunlight at a wavelength of 380 nm to 780 nm.

TABLE 1

| Layer Sequence | Layer-Material | Example 1 Layer Thickness [nm] | Comp. Example 1 Layer Thickness [nm] |
|---|---|---|---|
| Outer Pane 1 | Glass | | |
| First Dielectric Module M1 | $Si_3N_4$ | 21.2 | 10.1 |
| | ZnO | 7 | 7 |
| Blocking Layer | NiCr | 0.2 | 0.2 |
| First Silver Layer Ag1 | Ag | 17.8 | 11.1 |
| Blocking Layer | NiCr | 0.1 | 0 |
| Second Dielectric Module M2 | ZnO | 7 | 7 |
| | $Si_3N_4$ | 69.9 | 63.6 |
| | ZnO | 7 | 7 |
| Blocking Layer | NiCr | 0.1 | 0.6 |
| Second Silver Layer Ag2 | Ag | 9. | 11.8 |
| Blocking Layer | NiCr | 0.2 | 0.7 |
| Third Dielectric Module M3 | ZnO | 7 | 7 |
| | $Si_3N_4$ | 35.1 | 45.9 |
| | ZnO | 7 | 7 |
| Blocking Layer | NiCr | 0.1 | 0.4 |
| Third Silver Layer Ag3 | Ag | 7.6 | 10.6 |
| Blocking Layer | NiCr | 0.2 | 0.2 |
| Fourth Dielectric Module M4 | ZnO | 7 | 7 |
| | $Si_3N_4$ | 15.4 | 12.2 |

TABLE 2

Relative Layer Thicknesses in the Solar Protection Coating

| | Example 1 | Comparative Example 1 |
|---|---|---|
| Ag1/Ag2 | 1.98 | 0.94 |
| Ag2/Ag3 | 1.18 | 1.11 |
| Ag1/Ag3 | 2.34 | 1.05 |
| M2/M1 | 2.98 | 4.55 |
| M2/M3 | 1.71 | 1.30 |
| M2/M4 | 3.75 | 4.05 |

TABLE 3

Energy and Optical Parameters of the Composite Pane Having the Solar Protection Coating.

|  | Example 1 | Comparative Example |
|---|---|---|
| RE | 48.5 | 40.4 |
| RLext | 21.7 | 9.6 |
| TL | 4.8 | 4.7 |
| TTS | 12.4 | 14 |
| External Color | green | green |
| Color at 60° | blue | Rot/blue |
| RL at 60° | 23.1 | 13.4 |
| RLint | 2.7 | 2.6 |

Examples A Through E

The layer sequences of the solar protection coatings and the layer thicknesses of the Examples A through E are presented in Table 5. The relative layer thicknesses of the silver layers and of the dielectric modules, as well as the values for the optical and energy properties are reported in Table 6 and Table 7.

TABLE 5

| Layer Sequence | Layer Material | Example A | Example B | Example C | Example D | Example E |
|---|---|---|---|---|---|---|
| Outer Pane 1 | Glass | | | | | |
| First Dielectric Module M1 | SiNx | 8.0 | 10.6 | 9.0 | 16.4 | 7.9 |
|  | ZnSnOx | 8.0 | 8.0 | 8.0 | 8.0 | 8.1 |
|  | ZnO | 10.0 | 10.0 | 10.0 | 10.0 | 12.3 |
| First Silver Layer Ag1 | Ag | 15.8 | 19.0 | 16.5 | 17.8 | 13.3 |
| Blocking Layer | NiCr | 0.2 | 0.2 | 0.2 | 0.2 | 0.2 |
| Second Dielectric Module M2 | ZnO | 10.0 | 10.0 | 10.0 | 10.0 | 15.0 |
|  | SiNx | 52.0 | 39.2 | 52.0 | 46.0 | 37.9 |
|  | ZnSnOx | 8.0 | 8.0 | 8.0 | 8.0 | 9.3 |
|  | ZnO | 10.0 | 10.0 | 10.0 | 10.0 | 13.5 |
| Second Silver Layer Ag2 | Ag | 12.3 | 10.6 | 14.3 | 10.8 | 12.1 |
| Blocking Layer | NiCr | 0.2 | 0.2 | 0.2 | 0.2 | 0.8 |
| Third Dielectric Module MM3 | ZnO | 10.0 | 10.0 | 10.0 | 10.0 | 13.0 |
|  | SiNx | 38.5 | 21.5 | 39.5 | 27.0 | 30.5 |
|  | ZnSnOx | 8.0 | 8.0 | 8.0 | 8.0 | 9.1 |
|  | ZnO | 10.0 | 10.0 | 10.0 | 10.0 | 14.2 |
| Third Silver Layer Ag3 | Ag | 9.5 | 10.0 | 8.5 | 8.3 | 9.9 |
| Blocking Layer | NiCr | 0.2 | 0.2 | 0.2 | 0.2 | 0.2 |
| Fourth Dielectric Module M4 | ZnO | 10.0 | 10.0 | 10.0 | 10.0 | 16.8 |
|  | SiNx | 22.5 | 20.0 | 35.6 | 20.3 | 18.7 |

TABLE 6

Relative Layer Thicknesses of the Solar Protection Coating of the Finished Composite Panes of Examples A Through E

|  | A | B | C | D | E |
|---|---|---|---|---|---|
| Ag1/Ag2 | 1.28 | 1.79 | 1.15 | 1.65 | 1.10 |
| Ag2/Ag3 | 1.29 | 1.06 | 1.68 | 1.30 | 1.22 |
| Ag1/Ag3 | 1.66 | 1.90 | 1.94 | 2.14 | 1.34 |
| M2/M1 | 3.12 | 2.36 | 3.00 | 2.16 | 2.57 |
| M2/M3 | 1.21 | 1.37 | 1.19 | 1.36 | 1.13 |
| M2/M4 | 2.47 | 2.24 | 1.75 | 2.45 | 2.30 |

TABLE 7

Energy and Optical Parameters of the Composite Panes of Example A through E

|  | A | B | C | D | E |
|---|---|---|---|---|---|
| TL | 5.4 | 5.2 | 5.6 | 5.3 | 6.2 |
| RL1 | 20.9 | 20.0 | 19.3 | 20.5 | 11.8 |
| a*R 8° | −0.9 | −12.6 | −8.5 | −10.0 | −5.0 |
| b*R 8° | −9.8 | −4.6 | −18.8 | −11.1 | −10.5 |
| RL 60° | 21.5 | 22.0 | 18.9 | 20.9 | 15.5 |
| a*R 60° | −3.2 | −3.3 | −3.2 | −4.2 | −3.3 |
| b*R 60° | −8.2 | −6.9 | −18.9 | −12.4 | −8.4 |
| RE | 45.6 | 50.7 | 47.6 | 48.5 | 45.3 |
| TTS | 13.7 | 12.2 | 13.2 | 12.9 | 13.8 |
| Ext color | blue | green | blue | green | blue |
| Color @60° | blue | blue | blue | blue | blue |

TABLE 8

Relative Layer Thicknesses of the Solar Protection Coating of the Finished Composite Panes in the Comparative Example V2

| Comparative Example | V2 |
|---|---|
| Ag1/Ag2 | 1.14 |
| Ag2/Ag3 | 1.08 |
| Ag1/Ag3 | 1.23 |
| M2/M1 | 2.85 |
| M2/M3 | 0.96 |
| M2/M4 | 2.14 |

TABLE 9

Energy and Optical Parameters of the Composite Panes in accordance with Comparative Example V2

| Comparative Example | V2 |
|---|---|
| TL | 5.9 |
| RLext | 13.3 |
| RL 60° | 20.1 |
| TTS | 12.4 |
| External Color | yellow |
| Color at 60° | orange |

According to the invention, composite panes having a solar protection coating structured according to the invention are provided which were successfully improved in terms of energy performance, thermal and visual comfort, and at the same time in terms of aesthetic appearance and were further optimized compared to known composite panes having solar protection coatings. Energy reflection of RE>36%, preferably of RE>39%, was achieved. With the solar protection coating according to the invention, composite panes can be provided in conjunction with a thermal-radiation-reflecting coating, which panes can additionally have a particularly low total transmitted thermal radiation (TTS) of less than 14%, in particular even less than 13%, while, at the same time, achieving optimum aesthetic appearance without undesirable color tones in the reflection of the composite pane. In particular, undesirable red and yellow reflections or haze of the composite pane can be avoided. According to the invention, in essence, constant, desirable color reflection of the composite pane can be achieved regardless of the viewing angle.

LIST OF REFERENCE CHARACTERS

1 outer pane
2 inner pane
3 thermoplastic intermediate layer 3a first thermoplastic film
3b second thermoplastic film
4 solar protection coating
5 thermal protection coating
6 carrier film
I outer surface of 1
II inner surface of 1
III outer surface of 2
IV inner surface of 2
Ag1 first silver layer
Ag2 second silver layer
Ag3 third silver layer
M1 first dielectric module
M2 second dielectric module
M3 third dielectric module
M4 fourth dielectric module
B blocking layer
B1 first blocking layer
B2 second blocking layer
B3 third blocking layer

The invention claimed is:

1. A composite pane, comprising an outer pane having an exterior-side surface and an interior-side surface, an inner pane having an exterior-side surface and an interior-side surface, and a thermoplastic intermediate layer that joins the interior-side surface of the outer pane to the exterior-side surface of the inner pane, wherein the composite pane has, between the outer pane and the inner pane at least one solar protection coating,
wherein
the solar protection coating comprises, starting from a direction of the outer pane toward the inner pane, a layer sequence of
first dielectric module with a thickness M1,
first silver layer with a thickness Ag1,
second dielectric module with a thickness M2,
second silver layer with a thickness Ag2,
third dielectric module with a thickness M3,
third silver layer with a thickness Ag3,
fourth dielectric module with a thickness M4,
wherein the first, second and third silver layers have a layer thickness relative to one another of Ag1/Ag2>1 and Ag1/Ag3>1, and the first, second, third and fourth dielectric modules have a relative layer thickness of M2/M1>1, M2/M3>1, and M2/M4>1.

2. The composite pane according to claim 1, wherein the first, second and third silver layers of the solar protection coating have a relative layer thickness of Ag1/Ag2>1 and 1<Ag1/Ag3<3.

3. The composite pane according to claim 1, wherein the second and the third silver layer of the solar protection coating have a relative layer thickness of 0.5<Ag2/Ag3<2.0.

4. The composite pane according to claim 1, wherein the first, second, third and fourth dielectric modules have a relative layer thickness M2/M1>1, M2/M3>1.1, and M2/M4>1.5.

5. The composite pane according to claim 1, wherein the first, second, third and fourth dielectric modules have at least one nitride layer.

6. The composite pane according to claim 5, wherein the at least one nitride layer is a silicon nitride layer.

7. The composite pane according to claim 1, wherein the layer sequence of the solar protection coating, includes at least one blocking layer.

8. The composite pane according to claim 7, wherein the at least one blocking layer is in contact with one of the first, second and third silver layers.

9. The composite pane according to claim 1, wherein the solar protection coating is applied on the interior-side surface of the outer pane or on the exterior-side surface of the inner pane or wherein the solar protection coating is introduced into the thermoplastic intermediate layer.

10. The composite pane according to claim 1, wherein the thermoplastic intermediate layer contains a carrier film that has the solar protection coating.

11. The composite pane according to claim 1, wherein the composite pane has external energy reflection RE>36%.

12. The composite pane according to claim 1, wherein a visible external reflection RLext is >8%.

13. The composite pane according to claim 1, wherein a thermal-radiation-reflecting coating is applied on the interior-side surface of the inner pane.

14. The composite pane according to claim 13, wherein the thermal-radiation-reflecting coating has a functional layer based on an indium tin oxide layer (ITO) or a tin oxide layer (SnO2), with the indium tin oxide layer or the tin oxide layer arranged between two dielectric layers.

15. The composite pane according to claim 13, wherein the thermal-radiation-reflecting coating has emissivity of at most 50%.

16. The composite pane according to claim 15, wherein the thermal-radiation-reflecting coating has emissivity of at most 30%.

17. A method for producing a composite pane according to claim 1, comprising:
applying a solar protection coating on the interior-side surface of the outer pane, or on the exterior-side surface of the inner pane, or introducing the solar protection coating into the thermoplastic intermediate layer; and
joining the outer pane and the inner pane via the thermoplastic intermediate layer.

18. The method for producing a composite pane according to claim 17, wherein a thermal-radiation-reflecting coating is applied on the interior-side surface of the inner pane.

19. A method comprising providing a locomotion vehicle for travel on land, in the air, or on water or a functional individual piece or a building with a composite pane according to claim 1.

20. The method according to claim 19, wherein the composite pane is a windshield, rear window, side window, and/or roof panel of the locomotion vehicle.

* * * * *